Patented Feb. 25, 1941

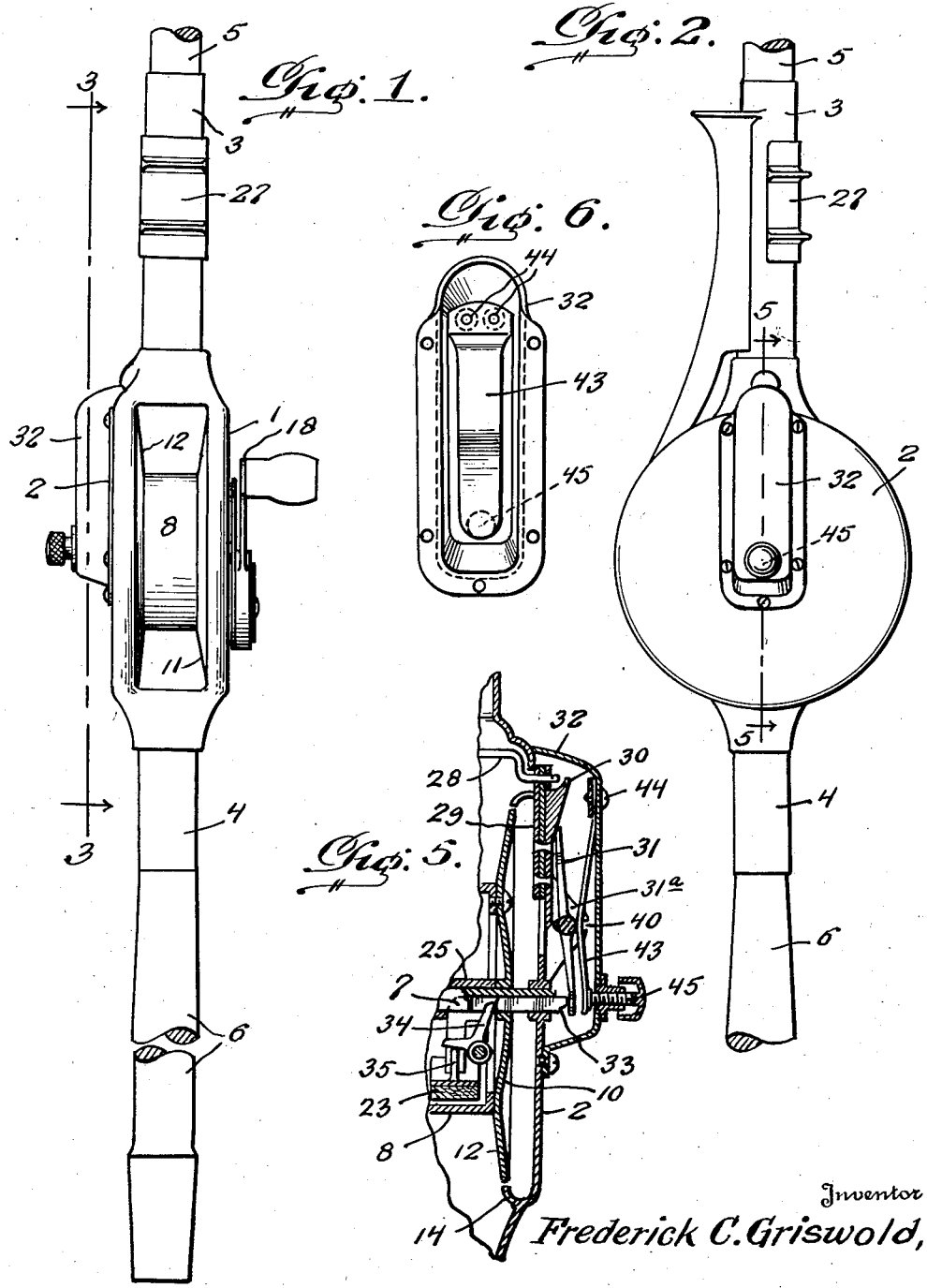

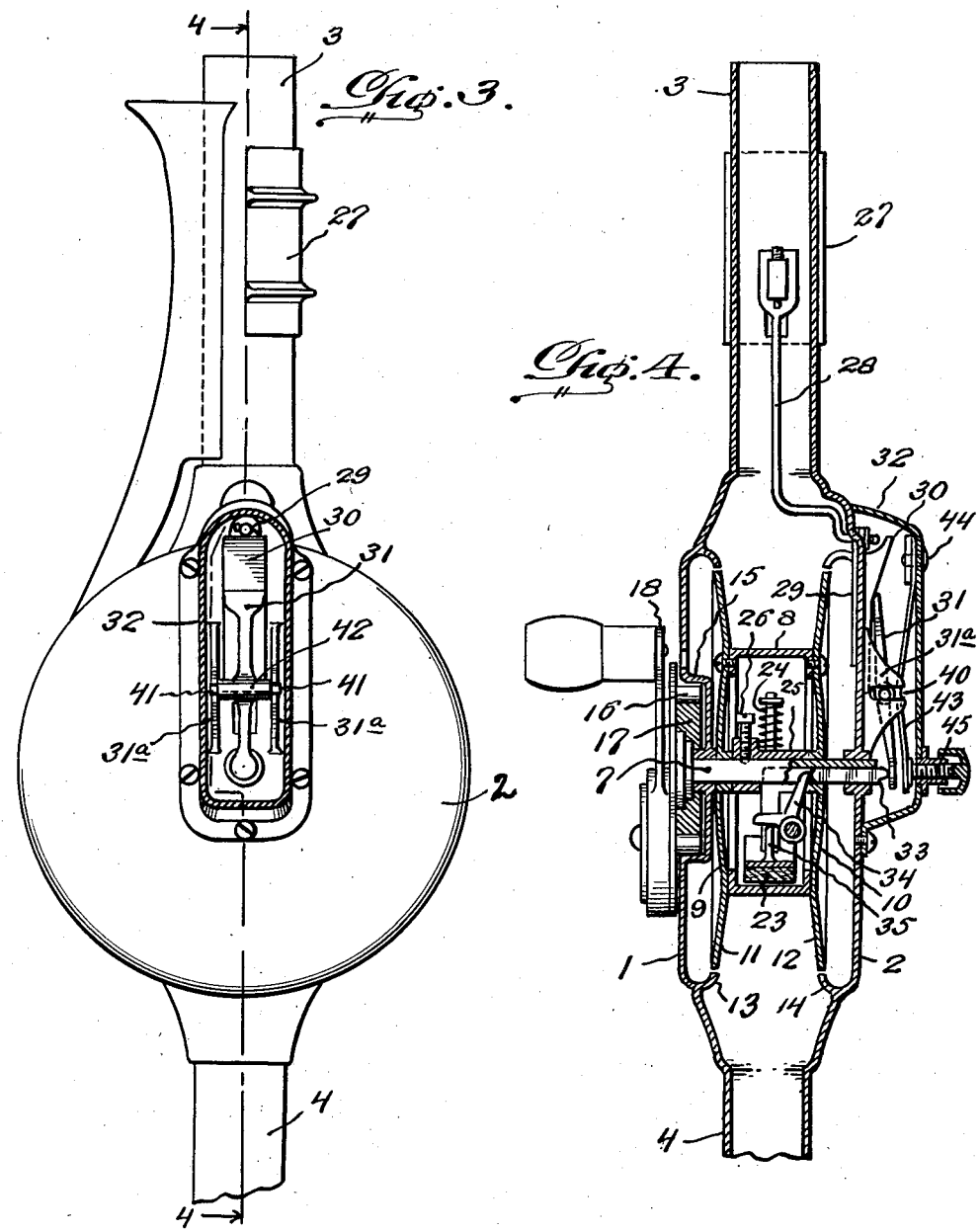

2,233,208

UNITED STATES PATENT OFFICE 2,233,208

FISH LINE REEL

Frederick C. Griswold, Port Jefferson, N. Y.

Application January 8, 1940, Serial No. 312,995

6 Claims. (Cl. 242—84.5)

This invention relates to improvements in fish line reels of the type shown in my U. S. Patents Nos. 2,120,068 and 2,120,069 granted June 7, 1938, wherein a finger slide mounted on the front tubular extension of the reel casing is operatively connected with a friction clutch carried by a cross shaft rotatable in the casing, for bringing the clutch into more or less frictional contact with a spool rotatable on the cross shaft.

In the construction shown in my above-mentioned patents, the operative connection between the finger slide and the friction clutch is rendered yieldable for preventing a harsh or undue binding effect of the clutch shoe when moved into contact with the spool, by providing a yielding cam extension on the slidable bar and in position to actuate the rock lever pivoted on one side of the reel casing.

An object of the present invention is to provide a more durable and efficient operative connection between the finger slide and the friction clutch, by providing a rigid cam extension on the slidable bar and yieldably mounting the rock lever for movement laterally of the reel casing so that a harsh or undue binding effect of the clutch shoe is prevented when said clutch shoe is moved into contact with the spool.

It will further be noted that, with the construction disclosed in my above-mentioned patents, the degree of application of the clutch shoe is limited by the throw of the finger slide, making it difficult to accurately adjust the operation of the friction clutch for varying the frictional resistance offered to rotation of the spool in the direction which results in paying out the line. Also, such frictional resistance may not be increased beyond the point afforded by operation of the finger slide for the full length of its stroke.

Another important object of the present invention, therefore, is to provide for ready and accurate adjustment of the maximum degree of application of the friction clutch, which is possible through operation of the finger slide for its complete stroke. I accomplish this by mounting the rock lever for movement bodily in a direction laterally of the reel casing and by providing manually operable means for laterally adjusting such rock lever so as to vary the normal position of the friction clutch with respect to the spool. Also, the adjusting means for the rock lever is yieldable or resilient for permitting corresponding lateral yielding of the rock lever bodily with respect to the reel casing so as to prevent the above-mentioned harsh or undue binding effect of the clutch shoe when moved into contact with the spool.

A preferred embodiment of the present invention is illustrated in the accompanying drawings, in which:

Figure 1 is a top plan view of a reel constructed in accordance with the present invention, together with the adjoining fore and butt portions of a fishing rod.

Figure 2 is a side elevational view looking toward the right of Figure 1.

Figure 3 is a section on line 3—3 of Figure 1.

Figure 4 is a longitudinal section on line 4—4 of Figure 3.

Figure 5 is an enlarged fragmentary longitudinal section on line 5—5 of Figure 2; and Figure 6 is an inner face view of the housing and spring which is secured to a side of the reel casing to enclose the rock lever and adjacent parts of the operative connection between the finger slide and the friction clutch.

Referring in detail to the drawings, the present device has been shown as including a reel casing comprising side plates 1 and 2, and front and rear tubular extensions 3 and 4 which are fitted to receive the fore and butt portions 5 and 6 of a fishing rod.

A cross shaft 7 is rotatably mounted in the side plates 1 and 2 of the reel casing, and a reel spool is rotatably mounted on the cross shaft 7. This spool comprises a cylindrical sleeve 8 and end plates 9 and 10 which are developed into flanges 11 and 12. The inner faces of the side plates 1 and 2 of the casing are provided with inwardly directed annular flanges 13 and 14 which overlap and serve as guards for the peripheral edges of the spool flanges 11 and 12.

The side plate 1 of the casing has a central recess 15 within which is located a one-way brake for locking the cross shaft to the casing against reverse rotation. This one-way brake is of well known construction and of the roller type including rollers 16 arranged in cam recesses of a disk 17 which is fixed to the cross shaft 7. A hand crank 18 is shown as pivoted eccentrically on the disk 17 as described in my above-mentioned Patent No. 2,120,068, but it may be provided as described in my above-mentioned Patent No. 2,120,069.

A manually operable friction clutch is provided to connect the spool to the cross shaft when the clutch is applied. This clutch is located within the sleeve 8 of the spool and comprises a shoe 23 yieldingly held away from its frictional contact with the inner face of the sleeve 8 by spring means 24 carried by a sleeve 25 fixed to the cross shaft 7 by a set screw 26 or the like.

Manually operable control means is provided for the friction clutch, comprising a finger slide 27 mounted on the top of the front tubular extension 3 of the reel casing in position to be readily operated by the thumb of the user, said slide being operatively connected to the clutch shoe 23. This operative connection includes a rod 28 within the tubular front extension 3 and connecting the finger slide 27 with a bar 29 slidable on the side plate 2 of the reel casing. The slidable bar 29 is provided with a cam extension 30 engaging the outer arm of a rock lever 31 pivoted in brackets 31a secured to the outer face of the side plate 2. A housing 32 is removably attached to the side plate 2 and covers the rock lever 31 and adjacent parts. The inner arm of rock lever 31 engages the outer end of a pin 33 slidable lengthwise in the cross shaft 7, the other end of which pin engages one arm of a bell crank lever 34 pivoted on sleeve 25 fixed to the cross shaft. The other arm of this bell crank lever 34 engages a projection 35 on the clutch shoe 23. Thus far described, the construction is generally similar to that shown in my above-mentioned patents.

In accordance with the present invention, the brackets 31a are provided with slots 40 which are elongated in a direction parallel with the cross shaft 7 and in which are pivotally and slidably engaged the trunnions 41 of a rock shaft 42 supporting lever 31. The lever 31 is thus bodily movable laterally relative to the brackets 31a, being more particularly tiltable about the point of contact of such lever with the cam 30. Thus, by adjusting the position of the lever 31, the position of pin 33 may be correspondingly adjusted so as to determine the normal position of the clutch 23 with respect to the sleeve 8. In this way, the capacity of the friction clutch may be varied so as to regulate the degree of resistance to unwinding of the spool when the finger slide 27 is fully retracted. The adjustment of rock lever 31 is preferably effected by yieldable means so as to prevent a harsh or undue binding effect of the clutch shoe when moved into contact with the inner surface of the sleeve 8 by retraction of the finger slide 27. For this purpose, I have provided an inwardly bowed spring 43, one end of which is attached to the housing 32 as at 44, and the intermediate portion of which is arranged to bear on the central portion of the lever 31. The other end of spring 43 is free and is impinged by the inner end of an adjusting screw 45 adjustably threaded through the outer wall of the housing 32. By adjusting the screw 45, the pressure of the spring 43 imposed upon the rock shaft 42 and lever 31 may be varied so as to yieldingly adjust said lever 31 for the purpose mentioned above. With this arrangement, the cam extension 30 on the slide bar 29 may be of rigid form as shown. It will be seen that when the finger slide 27 is fully advanced, the spool may unwind freely. As the slide 27 is retracted, the frictional effect on the spool is increased up to the full capacity of the friction clutch, which capacity may be varied by adjustment of the screw 45 as described above.

It will be evident that various changes may be made in the specific construction, form and arrangement of parts illustrated and described, without departing from the spirit and scope of the invention as claimed.

What I claim as new is:

1. In a fish line reel, a casing, a cross shaft rotatable therein, a spool rotatable on the cross shaft, a friction clutch attached to the cross shaft and engageable with the spool, manually operated means for bringing the friction clutch into frictional contact with the spool, said means including an actuating member having fixed limits of movement, an actuated member operatively connected to the clutch, and a third member operatively connecting and bodily movable toward or away from said actuating and actuated members, and manually operable means for adjustably limiting the movement of said third member away from said actuating and actuated members for varying the possible degree of application of the friction clutch.

2. In a fish line reel, a casing, a cross shaft rotatable therein, a spool rotatable on the cross shaft, a friction clutch attached to the cross shaft and engageable with the spool, manually operated means for bringing the friction clutch into frictional contact with the spool, said means including an actuating member having fixed limits of movement, an actuated member operatively connected to the clutch, and a third member operatively connecting and bodily movable toward or away from said actuating and actuated members, and manually operable means for adjustably limiting the movement of said third member away from said actuating and actuated members for varying the possible degree of application of the friction clutch, said last-named means including a spring bearing on said third member and means for adjusting the tension of said spring for rendering said manually operated means yieldable to prevent harsh or undue binding of the clutch when moved into contact with said spool.

3. A fish line reel comprising a spool, a casing therefor, a friction clutch located within the spool, a finger slide mounted on the casing so as to have fixed limits of movement, means operatively connecting the friction clutch and slide, said means comprising a bell crank lever within the spool, a second lever mounted on the casing for pivotal and bodily movement relative thereto, a pin movable axially of the spool and operatively connecting said levers, a slide bar on the casing engaging the second lever, a rod operatively connecting the slide bar with the finger slide, and manually adjustable means for bodily shifting said second lever for varying the possible degree of application of the clutch by the operation of said finger slide.

4. A fish line reel comprising a spool, a casing therefor, a friction clutch located within the spool, a finger slide mounted on the casing so as to have fixed limits of movement, means operatively connecting the friction clutch and slide, said means comprising a bell crank lever within the spool, a second lever mounted on the casing for pivotal and bodily movement relative thereto, a pin movable axially of the spool and operatively connecting said levers, a slide bar on the casing engaging the second lever, a rod operatively connecting the slide bar with the finger slide, manually adjustable means for bodily shifting said second lever for varying the possible degree of application of the clutch by the operation of said finger slide, said last-named means comprising a bowed spring bearing on said second lever, and a screw bearing on said spring and operable for adjusting the degree of pressure of said spring upon said second lever.

5. A fish line reel comprising a spool, a casing therefor, a friction clutch located within the spool, a finger slide mounted on the casing so as to have fixed limits of movement, yielding means operatively connecting the friction clutch and slide, said yielding means comprising a bell crank lever within the spool, a second lever mounted on the casing for pivotal and bodily movement, a pin movable axially of the spool and operatively connecting said levers, a slide bar on the casing having a rigid cam extension engaging the second lever, and a bowed spring bearing on said second lever to yieldingly maintain the latter engaged with said cam extension and said pin.

6. A fish line reel comprising a spool, a casing therefor, a friction clutch located within the spool, a finger slide mounted on the casing so as to have fixed limits of movement, yielding means operatively connecting the friction clutch and slide, said yielding means comprising a bell crank lever within the spool, a second lever mounted on the casing for pivotal and bodily movement, a pin movable axially of the spool and operatively connecting said levers, a slide bar on the casing having a rigid cam extension engaging the second lever, a bowed spring bearing on said second lever to yieldingly maintain the latter engaged with said cam extension and said pin, and manually adjustable means for varying the pressure of said spring on said second lever.

FREDERICK C. GRISWOLD.